(12) United States Patent
Nakamichi

(10) Patent No.: US 11,119,357 B2
(45) Date of Patent: Sep. 14, 2021

(54) DISPLAY APPARATUS

(71) Applicant: SAKAI DISPLAY PRODUCTS CORPORATION, Sakai (JP)

(72) Inventor: Kazuki Nakamichi, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 17/058,462

(22) PCT Filed: May 31, 2018

(86) PCT No.: PCT/JP2018/021017
§ 371 (c)(1),
(2) Date: Nov. 24, 2020

(87) PCT Pub. No.: WO2019/229948
PCT Pub. Date: Dec. 5, 2019

(65) Prior Publication Data
US 2021/0200034 A1    Jul. 1, 2021

(51) Int. Cl.
*G02F 1/13357* (2006.01)
*G02F 1/1335* (2006.01)

(52) U.S. Cl.
CPC .. *G02F 1/133608* (2013.01); *G02F 1/133504* (2013.01); *G02F 1/133606* (2013.01); *G02F 1/133607* (2021.01)

(58) Field of Classification Search
None
See application file for complete search history.

(56) References Cited

FOREIGN PATENT DOCUMENTS

JP    2012-113873 A    6/2012

*Primary Examiner* — Phu Vu
(74) *Attorney, Agent, or Firm* — ScienBiziP, P.C.

(57) ABSTRACT

A display apparatus (1) comprises: a display panel (3); an optical sheet (4) having rectangular shape; and a support member (5) having a slider (S) supporting at least one side (41a) of the optical sheet, wherein the support member (5) has a support part (51) to which the slider (S) is slidably mounted, the optical sheet (4) has a fixing part to be fixed to the slider (S), the fixing part being provided along an end region positioned from a central region of the at least one side (41a) of the optical sheet (4) toward an end of the at least one side (41a) of the optical sheet (4), and the slider (S) slides with respect to the support part (51) in accordance with expansion and contraction of the optical sheet (4) in a direction along the at least one side (41a) of the optical sheet (4).

12 Claims, 11 Drawing Sheets

DISPLAY APPARATUS

TECHNICAL FIELD

The invention relates to a display apparatus.

BACKGROUND ART

A display apparatus such as a liquid crystal display apparatus comprises an optical sheet to diffuse or condense light from a light source. In a case of the liquid crystal display apparatus, the optical sheet is provided between a liquid crystal panel and the light source. An occurrence of deflecting or wrinkling of the optical sheet causes a shadow of light when the light from the light source passes through where the deflecting or wrinkling of the optical sheet occurs, causing a display failure of the display apparatus.

To suppress such an occurrence of the deflecting or wrinkling of the optical sheet, in Patent document 1, for example, the structure in which an optical sheet is suspended inside a display apparatus is used. The display apparatus having such a structure in which the optical sheet is suspended comprises a protrusion provided to a housing in a region outside a display region of the display apparatus, from which protrusion the optical sheet is suspended. The optical sheet comprises a hole to engage with the above-mentioned protrusion. The protrusion is passed through the hole in the optical sheet to cause the optical sheet to be suspended from the protrusion to be supported inside the display apparatus. Moreover, the optical sheet expands and contracts due to changes in the external environmental temperature or heat generated inside the display apparatus. Therefore, as shown in Patent document 1, a clearance is provided between the protrusion and the peripheral edge of the hole in the horizontal direction of the display apparatus.

For example, in a case that the optical sheet expands due to heat, the optical sheet is movable with respect to the protrusion in an amount corresponding to the clearance being provided between the protrusion and the peripheral edge of the hole in the horizontal direction. This can suppress the deflecting or the wrinkling of the optical sheet when the optical sheet expands.

PRIOR ART DOCUMENT

Patent Document

Patent Document 1: JP 2012-113873 A

SUMMARY OF THE INVENTION

Problem to be Solved by the Invention

However, with the above-described structure, in order to allow the optical sheet to move with respect to the protrusion, the optical sheet is mounted to a housing merely by inserting the protrusion into the hole formed in the optical sheet. As movement of the optical sheet in a direction being perpendicular to a surface of the optical sheet is not restricted, the optical sheet can flutter in a direction perpendicular to the surface of the optical sheet due to vibrations during conveyance in a case that the optical sheet is conveyed with the optical sheet being mounted to the housing. When the optical sheet flutters in the direction perpendicular to the surface of the optical sheet, the optical sheet can collide with another member being adjacent thereto in the thickness direction of the optical sheet, causing the optical sheet and/or another member being adjacent to be scratched. Moreover, in Patent document 1, as the hole to be engaged with the protrusion is a long hole, the strength thereof is low, and the peripheral edge of the hole can be deformed due to self-weight of the optical sheet when the optical sheet is suspended from the protrusion via the long hole. Consequently, a part in which the long hole is to be formed, the part projecting upward from one side of the optical sheet, needs to be enlarged in the vertical and horizontal directions to maintain the strength thereof, making it not possible to efficiently design the optical sheet.

Thus, in view of the problems as described above, an object of the invention is to provide a display apparatus that makes it possible to suppress an occurrence of a display failure caused by expansion and contraction of an optical sheet due to heat and to suppress scratching of the optical sheet and/or another member being adjacent to the optical sheet.

Means to Solve the Problem

A display apparatus according to one embodiment of the invention comprises: a display panel; an optical sheet having rectangular shape; and a supporting member having a slider supporting at least one side of the optical sheet, wherein the supporting member has a support part to which the slider is slidably mounted, the optical sheet has a fixing part to be fixed to the slider, the fixing part being provided along an end region positioned from a central region of the at least one side of the optical sheet toward an end of the at least one side of the optical sheet, and the slider slides with respect to the support part in accordance with expansion and contraction of the optical sheet in a direction along the at least one side of the optical sheet.

Effects of the Invention

The display apparatus according to the invention makes it possible to suppress an occurrence of a display failure caused by expansion and contraction of an optical sheet due to heat and to suppress scratching of the optical sheet and/or another member being adjacent to the optical sheet.

EMBODIMENT FOR CARRYING OUT THE INVENTION

Below, with reference to the drawings, a display apparatus according to embodiments of the invention is described. The display apparatus of the invention is not to be limited to the embodiments below.

First Embodiment

Figure 1:
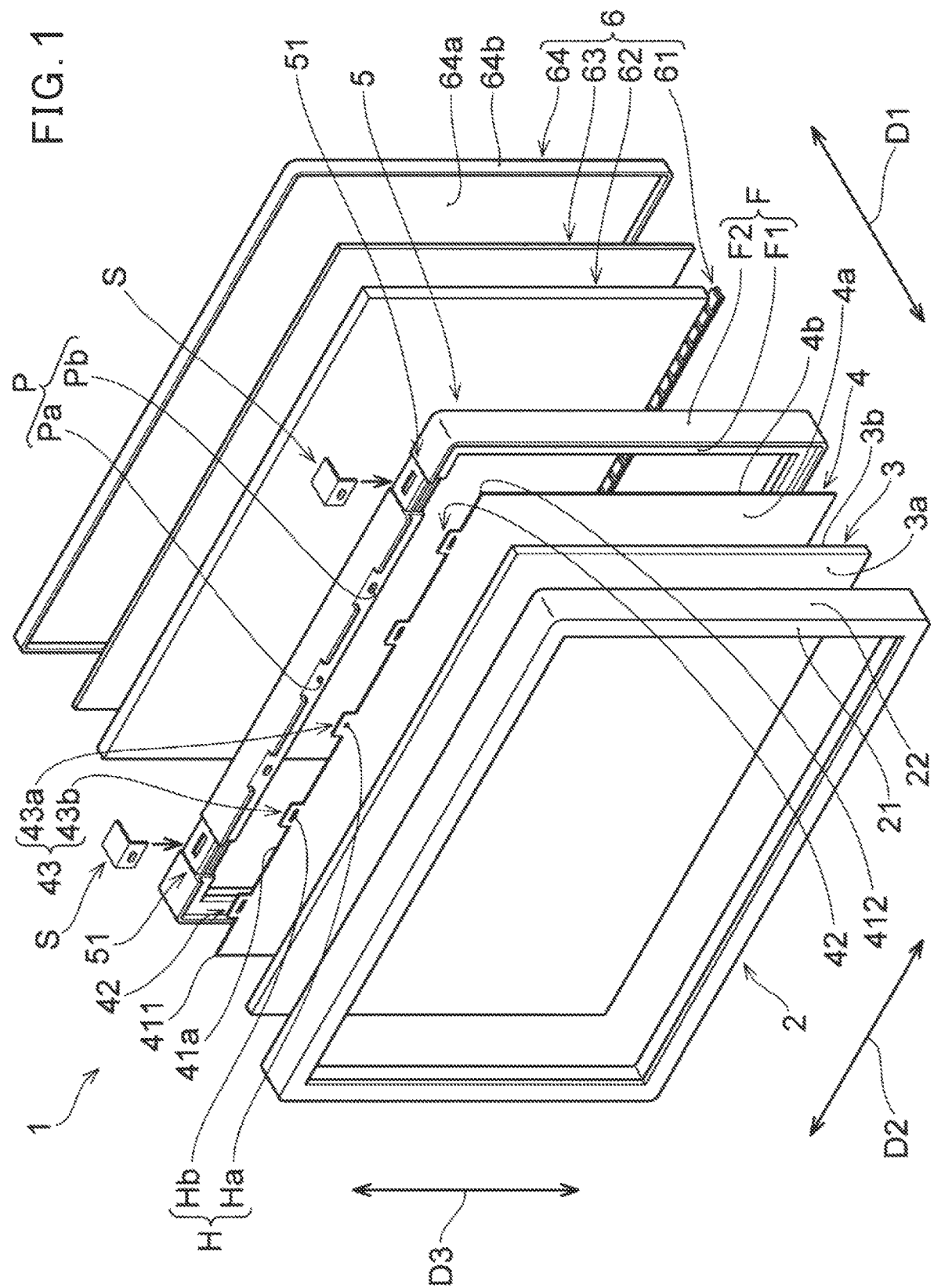
FIG. 1 schematically shows an exploded perspective view of a display apparatus according to one embodiment of the invention.

FIG. 1 schematically shows an exploded perspective view of a display apparatus 1 according to one embodiment of the invention. The display apparatus 1 according to the embodiment is a liquid crystal display apparatus comprising, as shown in FIG. 1, a bezel 2, a display panel 3, an optical sheet 4, a supporting member 5 for supporting the optical sheet 4, and a back-light unit 6. In the display apparatus 1, light being emitted from the back-light unit 6 passes through the optical sheet 4 to advance toward the display panel 3, causing a predetermined image to be displayed on the display panel 3. In the specification, a direction in which the image is displayed is called frontward, while a direction being opposite to the direction in which the image is displayed is called rearward, and both the frontward and rearward directions are called a front-rear direction D1. Moreover, with respect to each constituting element of the display apparatus 1, the longer direction of the display apparatus 1 is called a horizontal direction D2, while the shorter direction is called a vertical direction D3. Furthermore, a surface being front of each constituting element of the display apparatus 1, such as the display apparatus 1, the display panel 3, the optical sheet 4, the supporting member 5, and the back-light unit 6, is called a front surface, while the surface being opposite to the front surface is called a rear surface.

The bezel 2 is a rectangle-shaped member being positioned on the front surface of the display apparatus 1. While illustration thereof is omitted, the bezel 2 is configured to form a rectangle-shaped frame body by assembling four bezel components corresponding to four sides, respectively, of the display apparatus 1, for example. The bezel 2 has a frame part 21 and a lateral wall part 22. The frame part 21 extends in parallel to a front surface 3*a* of the display panel 3. The frame part 21 is formed in a frame shape and covers the peripheral region of the front surface 3*a* of the display panel 3. The lateral wall part 22 extends rearward of the display apparatus 1 perpendicularly to the frame part 21 from an outer periphery of the frame part 21. A rectangle-shaped opening is formed inner to the frame part 21 of the bezel 2 and, through the opening, an image being displayed in a display region of the display panel 3 is displayed.

The display panel 3 is a panel to display an image thereon. In the embodiment, the display panel 3 is a rectangular liquid crystal panel. The display panel 3 is arranged rearward of the frame part 21 of the bezel 2 and frontward of the optical sheet 4. The display panel 3 has a front surface 3*a* to display the image thereon and a rear surface 3*b* being a surface opposite to the front surface 3*a*. The front surface 3*a* of the display panel 3 opposes the rear surface of the frame part 21 of the bezel 2. The rear surface 3*b* of the display panel 3 opposes a front surface 4*a* of the optical sheet 4.

The display panel 3, the illustration of which is omitted, has, for example, a TFT substrate, an opposing substrate opposing the TFT substrate, and a liquid crystal layer being provided between the TFT substrate and the opposing substrate. The display panel 3 is not particularly limited in the structure thereof as long as the display panel 3 can display an image thereon. The display panel 3 may have the same structure as that of a known liquid crystal panel.

The optical sheet 4 diffuses and condenses light being emitted toward the optical sheet 4 from a light source 61 of the back-light unit 6 to emit light being uniform toward the display panel 3. The optical sheet 4 is arranged rearward of the display panel 3 and frontward of the back-light unit 6. The optical sheet 4 has a rectangular shape and has a front surface 4*a* facing the rear surface 3*b* of the display panel 3 and a rear surface 4*b* opposite to the front surface 4*a*. The front surface 4*a* of the optical sheet 4 opposes the rear surface 3*b* of the display panel 3, and the rear surface 4*b* of the optical sheet 4 opposes the back-light unit 6 (in the embodiment, the front surface of a light guiding plate 62). In the embodiment, emitted light from the light source 61 of the back-light unit 6 through the light guiding plate 62 enters into the optical sheet 4 from the rear surface 4*b* of the optical sheet 4. Light entered from the rear surface 4*b* of the optical sheet 4 is diffused and condensed by the optical sheet 4 and light having a uniform luminance distribution is emitted from the front surface 4*a* of the optical sheet 4 toward the rear surface 3*b* of the display panel 3.

For the optical sheet 4, a known optical sheet having the above-described functions may be used. In the embodiment, single optical sheet capable of diffusion and condensation of light is used. However, the structure of the optical sheet 4 is not particularly limited. For example, the optical sheet can be made up of a plurality of unit sheets such as two diffusing sheets, one prism sheet being sandwiched between the two diffusing sheets, or three optical sheets being separately provided.

The supporting member 5 supports the optical sheet 4 inside the display apparatus 1. In the embodiment, the supporting member 5 has a slider S supporting at least one side 41*a* of the optical sheet 4, and the optical sheet 4 is supported by the supporting member 5 via the slider S. In the embodiment, the upper end part of the optical sheet 4 is supported with the optical sheet 4 being suspended from the supporting member 5 in a vertically installed state in which the display apparatus 1 is installed perpendicularly to the horizontal surface. The supporting member 5 has a support part 51 to which the slider S is slidably mounted. The support part 51 is provided at a position according to the position of a below-described fixing part 42 of the optical sheet 4. In the embodiment, while the supporting member 5 supports only the one side 41*a* of the optical sheet 4 via the slider S, the supporting member 5 may support at least two sides of the optical sheet 4.

The shape and structure, and the position in the front-rear direction D1 of the support member 5 are not particularly limited as long as the support member 5 can support the optical sheet 4. In the embodiment, the supporting member 5 is a frame body F (a panel chassis) having a rectangular opening, the frame body F being provided frontward of the back-light unit 6. The frame body F has a front surface facing the rear surface 4b of the optical sheet 4 and a rear surface being a surface opposite to the front surface of the frame body F. The frame body F has a shape of a rectangular frame, and has an opening inner to the frame body F. The frame body F has a frame plate F1 that can abut to the peripheral region of the optical sheet 4 and a lateral plate F2 being provided perpendicularly to the frame plate F1 and extending in the front-rear direction D1 of the display apparatus 1.

The front surface of the frame plate F1 opposes the peripheral region of the rear surface 4b of the optical sheet 4 and the area of the opening being defined by the inner peripheral edge of the frame plate F1 is smaller than the area of the rear surface 4b of the optical sheet 4. The rear surface of the frame plate F1 opposes the peripheral region of the front surface of the light guiding plate 62 of the back-light unit 6. The area of the opening being defined by the inner peripheral edge of the frame plate F1 is smaller than the area of the front surface of the light guiding plate 62. The frame plate F1 has an engaging protrusion P projecting frontward from the front surface of the front plate F1. The engaging protrusion P engages with an engaging hole H being provided in the optical sheet 4 to suspend the optical sheet 4. In the embodiment, the engaging hole H is provided in a projecting part 43 projecting outward with respect to the one side 41a of the optical sheet 4 (upward with respect to the one side 41a in FIG. 1). However, an engaging hole may be formed inner to the one side 41a of the optical sheet (lower with respect to the one side 41a in FIG. 1) without forming the projecting part 43 in the optical sheet 4.

In the embodiment, as shown in FIG. 1, the supporting member 5 has one support part 51 each in proximity to each of the opposite ends of the frame plate F1 extending along the one side 41a of the optical sheet 4. The supporting member 5 has a plurality of engaging protrusions P (three in FIG. 1) between two support parts 51. The optical sheet 4 has a plurality of projecting parts 43 and a plurality of engaging holes H. The plurality of projecting parts 43 of the optical sheet 4 include a first projecting part 43a being provided at the center of the optical sheet 4 in the horizontal direction D2 and a second projecting part 43b being provided at a position being other than the center of the optical sheet 4 in the horizontal direction D2. The first projecting part 43a has a first engaging hole Ha. The second projecting part 43b has a second engaging hole Hb. The plurality of engaging protrusions P include a first engaging protrusion Pa to engage with the first engaging hole Ha and a second engaging protrusion Pb to engage with the second engaging hole Hb. The first engaging protrusion Pa engages with the first engaging hole Ha such that the optical sheet 4 does not move in the horizontal direction D2 when the optical sheet 4 expands or contracts in the horizontal direction D2. For example, the first engaging protrusion Pa being configured to be circular and the first engaging hole Ha being configured to be a circle of the size being the same as that of the first engaging protrusion Pa causes the gap between the outer periphery of the first engaging protrusion Pa and the inner edge of the first engaging hole Ha to be substantially eliminated. In this way, movement of the optical sheet 4 in the horizontal direction D2 in a central region R1 (see FIG. 2) in the horizontal direction D2 of the optical sheet 4 is suppressed. In the embodiment, the second projecting part 43b is provided between the first projecting part 43a and the below-described fixing part 42 of the optical sheet 4. The second engaging protrusion Pb is provided between the first engaging protrusion Pa and the support part 51. The outer periphery of the second engaging protrusion Pb and the edge of the second engaging hole Hb have a clearance in the horizontal direction D2 so that the optical sheet 4 can move in the horizontal direction D2 of the optical sheet 4 when the optical sheet 4 expands and contracts in the horizontal direction D2 of the optical sheet 4. Locations at which the second projecting part 43b, the second engaging hole Hb, and the second engaging protrusion Pb are provided are not particularly limited. For example, the second engaging protrusion Pb may be provided between the end of the frame plate F1 in the horizontal direction D2 and the support part 51, and the second projecting part 43b and the second engaging hole Hb may be provided at a position corresponding to the position of the second engaging protrusion Pb. Moreover, the second projecting part 43b, the second engaging hole Hb, and the second engaging protrusion Pb do not necessarily have to be provided.

Figure 2:
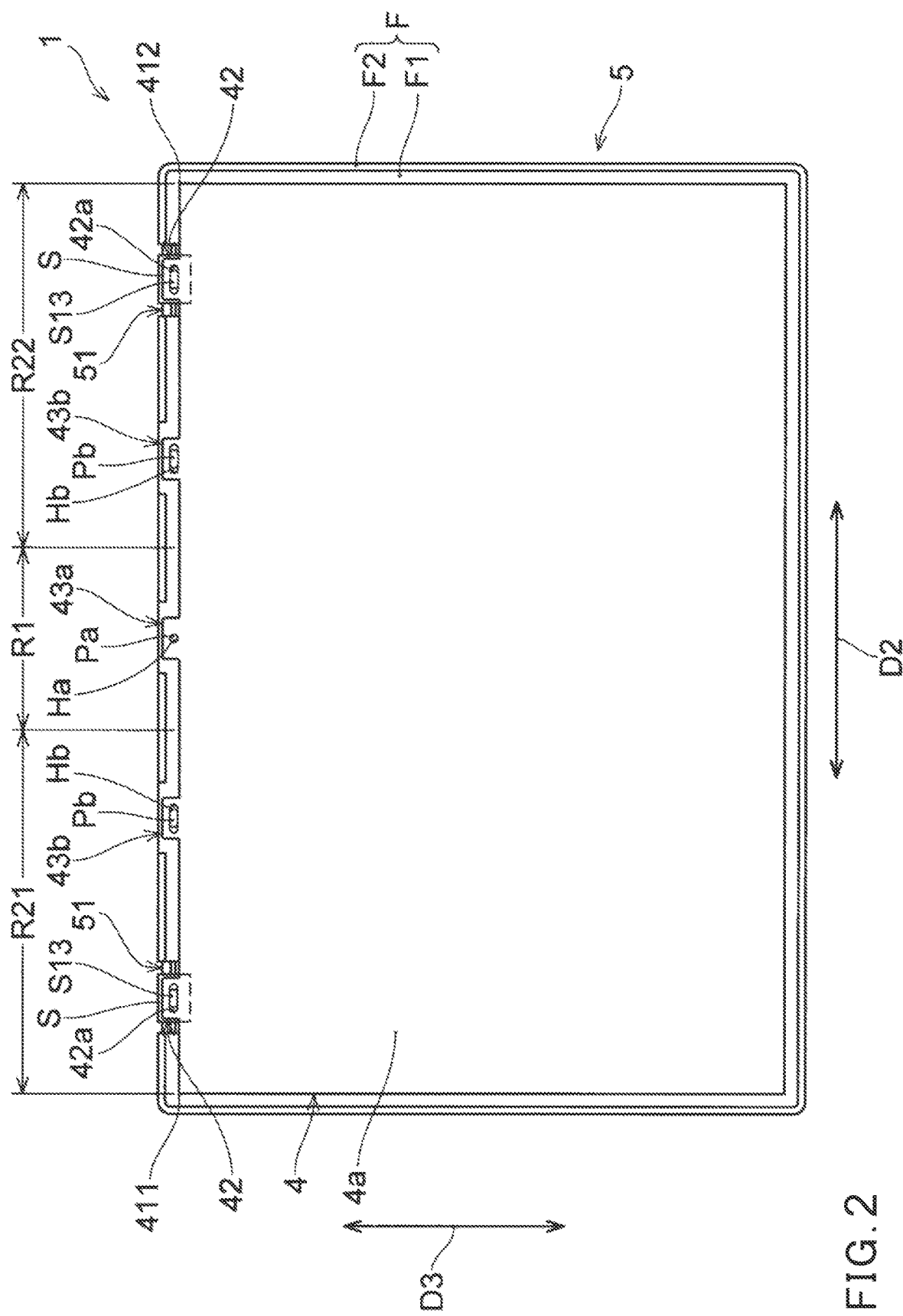
FIG. 2 shows the display apparatus shown in FIG. 1, wherein an optical sheet is suspended from a supporting member via a slider.

The lateral plate F2 projects frontward with respect to the front surface of the frame plate F1, and, as shown in FIG. 2, the optical sheet 4 is arranged inner to the lateral plate F2 when the optical sheet 4 is supported by the supporting member 5. Between the inner surface of the lateral F2 and the outer periphery of the optical sheet 4, a space in which the optical sheet 4 can expand outward when the optical sheet 4 expands is secured in the horizontal direction D2 and/or the vertical direction D3.

In the embodiment, as the supporting member 5, the frame body F being provided frontward of the back-light unit 6 is configured to support the optical sheet 4. However, as long as the supporting member can support the optical sheet 4, the supporting member may be a member other than the frame body F, such as a housing 64 of the back-light unit 6, for example. Moreover, the supporting member may support the optical sheet 4 with the housing 64 of the back-light unit 6 and the frame body F being combined. The detailed structure of the supporting member 5 and the slider S will be described below.

The back-light unit 6 emits light from the light source 61 toward the rear surface 3b of the display panel 3 in order to display an image on the display panel 3. The structure of the back-light unit 6 is not particularly limited. The back-light unit 6 may be an edge-light type back light or a direct light type back light.

In the embodiment, as shown in FIG. 1, the back-light unit 6 is of the edge-light type, and has a light source 61, a light guiding plate 62, and a reflection plate 63. Moreover, the back-light unit 6 has the housing 64 (a back-light chassis) configuring the rear surface of the display apparatus 1. The housing 64 is formed in a box shape having an opening frontward. Specifically, the housing 64 has a bottom plate 64a being the rear surface of the display apparatus 1 and extending substantially parallel to the display panel 3 and the optical sheet 4, and a lateral wall 64b extending frontward of the display apparatus 1 from the outer periphery of the bottom plate 64a. Constituting elements of the back-light unit 6, such as the light source 61, can be housed in an inner space defined by the bottom plate 64a and the lateral wall 64b.

Next, the support part 51 and the slider S of the display apparatus 1 in the embodiment are further described.

The support part 51 of the supporting member 5 is a part to which the slider D is mounted. The slider S is mounted to the support part 51 so as to slide with respect to the support part 51 of the supporting member 5 in a direction along the one side 41a of the optical sheet 4 (the horizontal direction D2). In the embodiment, as shown in FIG. 2, the support part 51 is positioned at the upper end part of the display apparatus 1 when the display apparatus 1 is installed vertically, and the optical sheet 4 is suspended from the support part 51 via the slider S.

Figure 3:
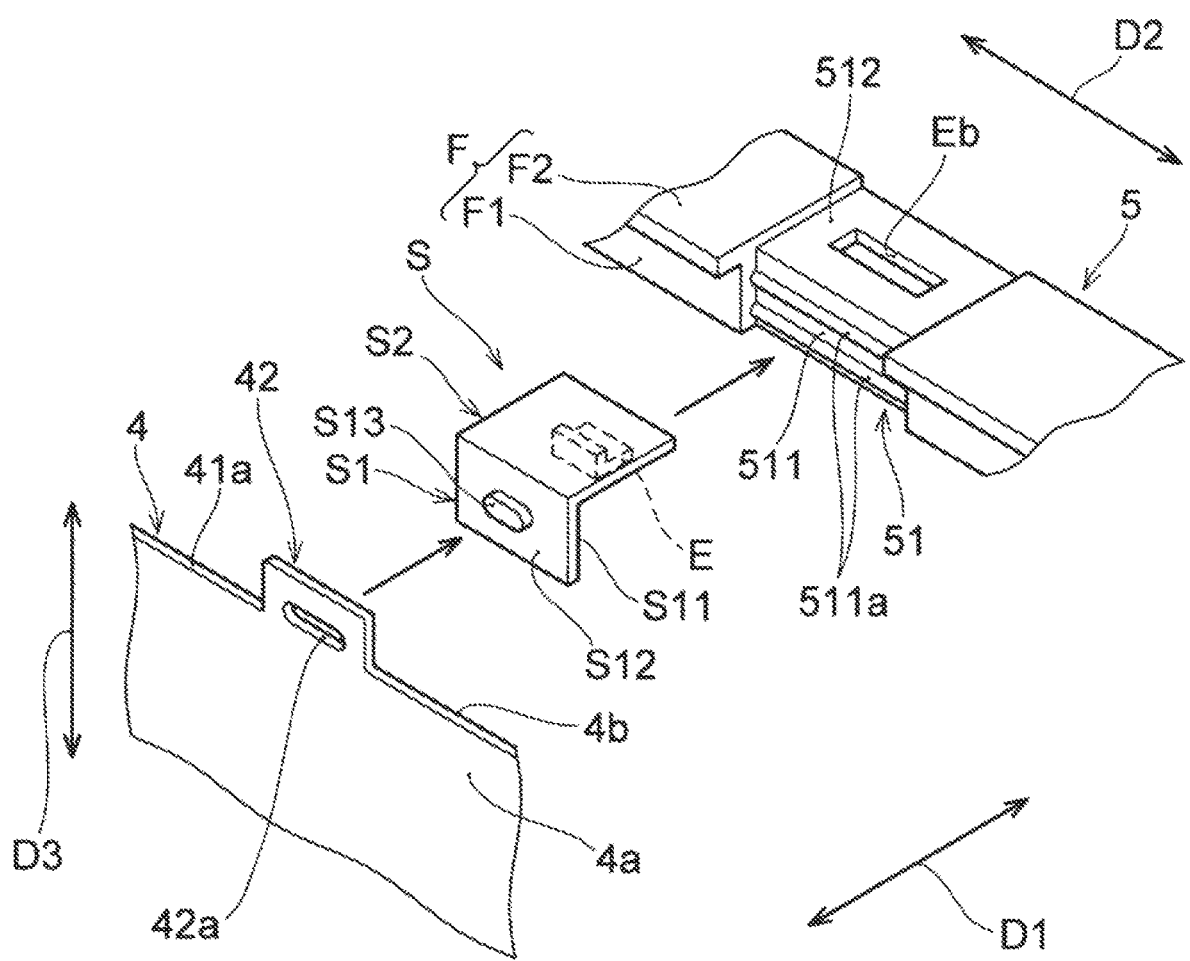
FIG. 3 shows a partially enlarged view of the display apparatus shown in FIG. 1, before the slider and the optical sheet are suspended from the supporting member.

As shown in FIG. 3, the support part 51 has a supporting surface 511 extending so as to oppose the rear surface 4b of the optical sheet 4. Moreover, the support part 51 has a second supporting surface 512 extending perpendicularly to the supporting surface 511 and in a direction along the one side 41a of the optical sheet 4. The second supporting surface 512 extends in parallel to the lateral surface F2 of the supporting member 5, the lateral surface F2 extending along the one side 41a of the optical sheet 4. In the embodiment, the slider S slides in the horizontal direction D2 along the supporting surface 511 and the second supporting surface 512. It suffices that the support part 51 may have either one of the supporting surface 511 and the second supporting surface 512 and it suffices that the slider S is slidable with respect to either one of the supporting surface 511 and second the second supporting surface 512.

The supporting surface 511 and the second supporting surface 512 of the support part 51 have a predetermined length in the horizontal direction D2 in which the slider S is movable in an amount corresponding to the dimensional change in the horizontal direction D2 due to expansion and contraction of the optical sheet 4. Moreover, as shown in FIG. 3, a stepped part is provided between the frame plate F1 and the supporting surface 511 (the apex of the protrusion 511a in a case that the protrusion 511a is provided) so that the slider S is flush with the front surface of the frame plate F1 when the slider S is mounted to the support part 51. In this way, the optical sheet 4 can be arranged in a flat state when the optical sheet 4 being fixed to the slider S is arranged along the front surface of the frame plate F1. Therefore, the deflecting or wrinkling of the optical sheet 4 at the support part 51 is suppressed. Similarly, as shown in FIG. 3, a stepped part is provided between the frame plate F2 and the second supporting surface 512 so that the slider S is flush with the outer surface (the upper surface) of the frame plate F2 when the slider S is mounted to the support part 51. In this way, when the slider S is mounted to the supporting member 5, the slider S does not become an obstacle when the supporting member 5 and the other members are assembled.

While the structure of the supporting surface 511 is not limited in particular, in the embodiment, the supporting surface 511 has a protrusion 511a projecting from a part of the supporting surface 511 as shown in FIG. 3. Therefore, the contact area of the slider S with respect to the support part 51 decreases, making it possible to decrease resistance of the slider S when the slider S slides. In the embodiment, the protrusion 511a is configured by two projected lines extending along the sliding direction of the slider S (the horizontal direction D2). However, as long as the contact area between the slider S and the support part 51 can be reduced, the shape of the protrusion is not particularly limited. For example, the protrusion may have a different shape, such as a plurality of protrusions each having a shape of semi-sphere. While the protrusion 511a is provided on the supporting surface 511 in the embodiment, the protrusion can be provided on the second supporting surface 512.

Moreover, the protrusion may be provided in the slider S rather than being provided on the supporting surface 511 (and the second supporting surface 512), or the protrusion may be provided both on the supporting surface 511 (and the second supporting surface 512) and in the slider S.

The slider S is mounted so as to slide with respect to the support part 51 in the horizontal direction D2. The fixing part 42 of the optical sheet 4 is fixed to the slider S. While material for the slider S is not particularly limited, the slider S is formed by a resin material that can easily slide with respect to the support part 51, such as PTFE or POM, for example. The material for the support part 51 may also be made to be the same material as that for the slider S. The shape and structure of the slider S are not particularly limited as long as the slider S is slidably mounted to the support part 51 and can fix to the fixing part 42 of the optical sheet 4.

Figure 5:
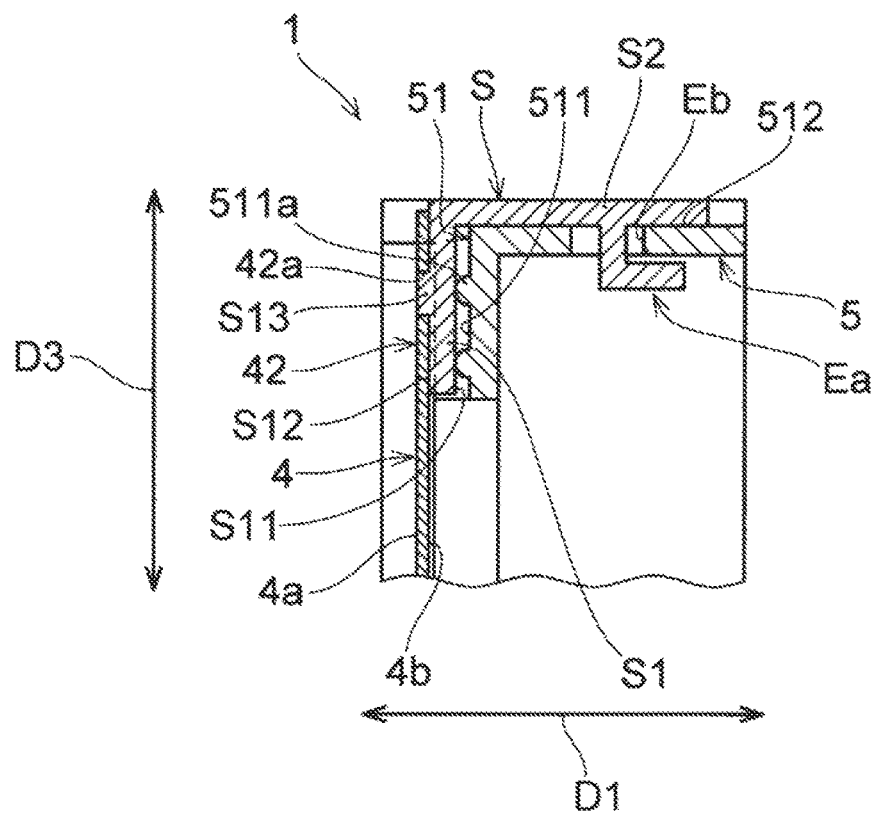
FIG. 5 shows a cross-sectional view along a line V-V in FIG. 4.

As shown in FIGS. 3 and 5, the slider S has a sliding surface S11 opposing the supporting surface 511 of the support part 51, and the sliding surface S11 slides with respect to the supporting surface 511. In the embodiment, the supporting surface 511 and the sliding surface S11 extend substantially parallel to the rear surface 4b of the optical sheet 4 and the direction in which the optical sheet 4 expands and contracts and the direction in which the slider S slides are in parallel. Therefore, the slider S can stably slide.

The slider S has a fixing surface S12 onto which the fixing part of the optical sheet 4 is fixed. Specifically, the slider S has a first plate-like part S1 arranged substantially parallel to the supporting surface 511. The first plate-like part S1 has the sliding surface S11 and the fixing surface S12 opposite to the sliding surface S11. The front surface of the first plate-like part S1 is the fixing surface S12 onto which the fixing part 42 is fixed and the rear surface is the sliding surface S11 opposing the supporting surface 511 of the support part 51. This configuration causes sliding of the slider S in the horizontal direction D2 according to expansion and contraction of the optical sheet 4 to be smooth. Moreover, as shown in FIGS. 3 and 5, the slider S has a second plate-like part S2 opposing the second supporting surface 512 of the support part 51. The first plate-like part S1 and the second plate-like part S2 are provided to be mutually perpendicular.

The second plate-like part S2 has an engaging part Ea for engaging the slider S with the support part 51 on a surface, which opposes the second supporting surface 512, of the second plate-like part S2. The engaging part Ea engages the slider S with the support part 51 to suppress the slider S falling off the supporting member 5. The engaging part Ea engages with an engaged part Eb being provided in the support part 51. In the embodiment, the engaging part Ea is an L-shaped protrusion projecting perpendicularly from a surface, which opposes the second supporting surface 512, of the second plate-like part S2 and extending rearward. The engaged part Eb is an engaging hole into which the L-shaped protrusion is inserted. When the engaging part Ea of the slider S is inserted into the engaged part Eb, which is an engaging hole and is provided on the second supporting surface 512, the engaging part Ea engages with a surface being opposite to the second supporting surface 512 to suppress the slider S falling off the supporting member 5. The shape and structure of the engaging part Ea and the engaged part Eb are not limited as long as they engage with each other to suppress the slider S falling off the supporting member 5. For example, either one of the engaging part and the engaged part may be formed in a protrusion shape with the other thereof being formed as a hole or in a recess shape to be engaged with each other. Further, both of the engaging part and the engaged part may be formed in a protrusion shape to be engaged with each other. An engaging part may be provided in the first plate-like part S1, with an engaged part being provided on the supporting surface 511.

Figure 4:
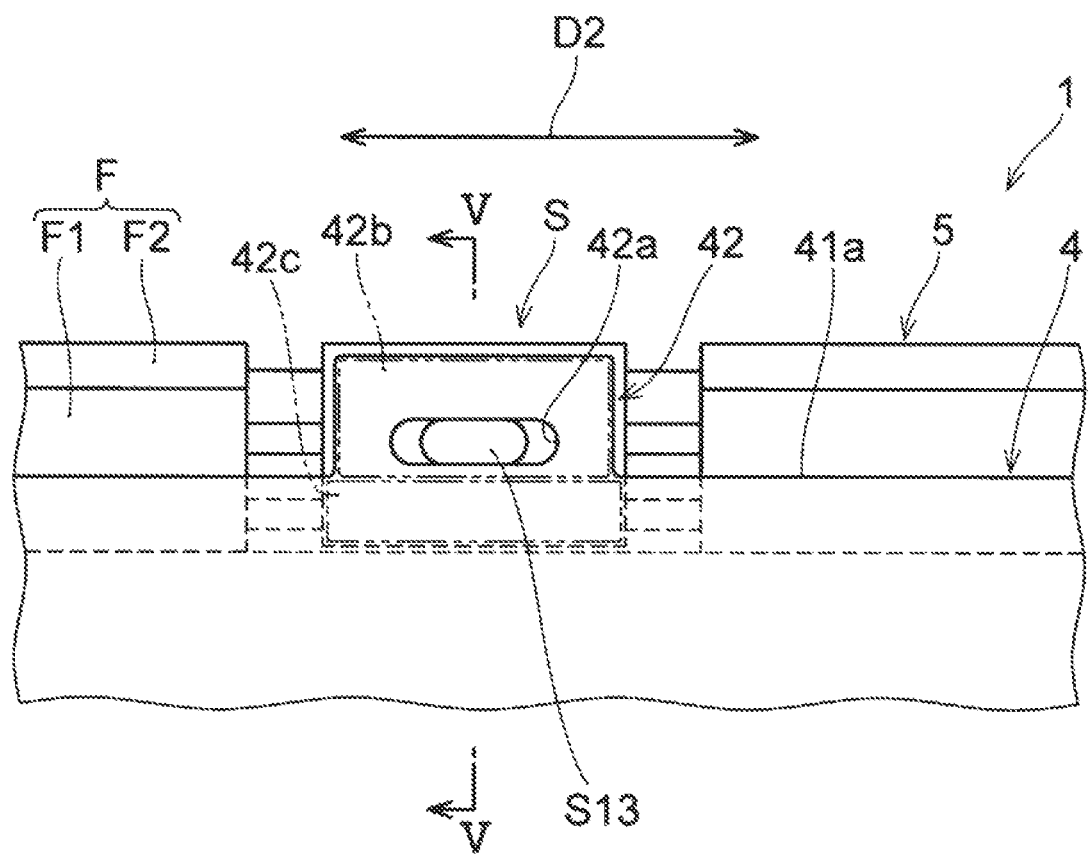
FIG. 4 shows a partially enlarged view of the display apparatus shown in FIG. 2 in the periphery of a support part of the supporting member.

As shown in FIGS. 3 to 5, the slider S has a positioning protrusion S13 for positioning when the optical sheet 4 is to be fixed to the slider S. In the embodiment, the positioning protrusion S13 is provided on the fixing surface S12 of the first plate-like part 51, and the fixing part 42 of the optical sheet 4 has a through hole 42a penetrating in the thickness direction of the optical sheet 4. The positioning protrusion S13 of the slider S engaging with the through hole 42a of the optical sheet 4 causes the optical sheet 4 to be positioned at a predetermined position when fixing the fixing part 42 of the optical sheet 4 onto the fixing surface S12 of the slider S. Therefore, fixing of the optical sheet 4 to the slider S can be easily performed. In the embodiment, as shown in FIG. 4, a clearance is provided in the horizontal direction D2 between the edge of the through hole 42a and the outer periphery of the positioning protrusion S13. In this case, the positioning protrusion S13 of the slider S can be easily inserted into the through hole 42a of the optical sheet 4, making it possible to easily mount the optical sheet 4 to the slider S. The positioning protrusion S13 and the through hole 42a are optional configurations, so that they do not necessarily have to be provided.

Moreover, as shown in FIG. 2, the optical sheet 4 has the fixing part 42 to be fixed to the slider S and the fixing part 42 is provided along end regions R21, R22 positioned from the central region R1 of the one side 41a of the optical sheet 4 toward ends from the central region R1 of the one side 41a of the optical sheet 4. The fixing part 42 and the slider S are fixed using a known fixing method such as fusion, adhesion, or screw fastening. The fixing part 42 and the slider S are fixed such that the fixing part 42 does not relatively move with respect to the slider S in at least the front-rear direction D1 and the horizontal direction D2. In the embodiment, the fixing part 42 of the optical sheet 4 is fixed to not move in the front-rear direction D1, the horizontal direction D2, and the vertical direction D3 with respect to the fixing surface S12 of the slider S.

The fixing part 42 is provided along the end regions R21, R22 of the one side 41a of the optical sheet 4 being supported by the supporting member 5. The central region R1 of the optical sheet 4 refers to a predetermined region from the center of the one side 41a of the optical sheet 4 being supported by the supporting member 5. While the range of the central region R1 is not particularly limited, it refers, for example, to the range being 10% of the length of the side 41a from the center of the one side 41a toward a first end 411 and a second end 412 of the one side 41a (In this case, the central region R1 occupies 20% of the length of the one side 41a). Moreover, the end regions R21, R22 refer to regions other than the central region R1 of the one side 41a. In other words, the end regions R21, R22 are a region (the first end region R21) from the central region R1 to the first end 411 and a region (the second end region R22) from the central region R1 to the second end 412 of the one side 41a. The support part 51 is provided at a position opposing the fixing part 42 of the optical sheet 4 in the front-rear direction D1.

In the embodiment, the fixing part 42 is provided in a part of the end regions R21, R22 along the end regions R21, R22. While the position at which the fixing part 42 is provided in the end regions R21, R22 is not particularly limited, the fixing part 42 is preferably provided in proximity to the end, for example, in a region between the first end 411 (or the second end 412) and a position being at 30% of the length of the one side 41a from the first end 411 (or the second end 412) toward the center of the one side 41a.

When the fixing part 42 of the optical sheet 4 is fixed to the slider S, the optical sheet 4 becomes integral with the slider S. This causes the slider S to slide with respect to the support part 51 in accordance with expansion and contraction of the optical sheet 4 in a direction along the one side 41a of the optical sheet 4 (the horizontal direction D2). Therefore, when the optical sheet 4 expands and contracts due to changes in the external environmental temperature or heat generated inside the display apparatus 1, the slider S slides with respect to the support part 51 in accordance with expansion and contraction of the optical sheet 4. In this way, the optical sheet 4 is maintained in a flat state, making it possible to suppress deflecting and wrinkling of the optical sheet 4.

Figure 6:
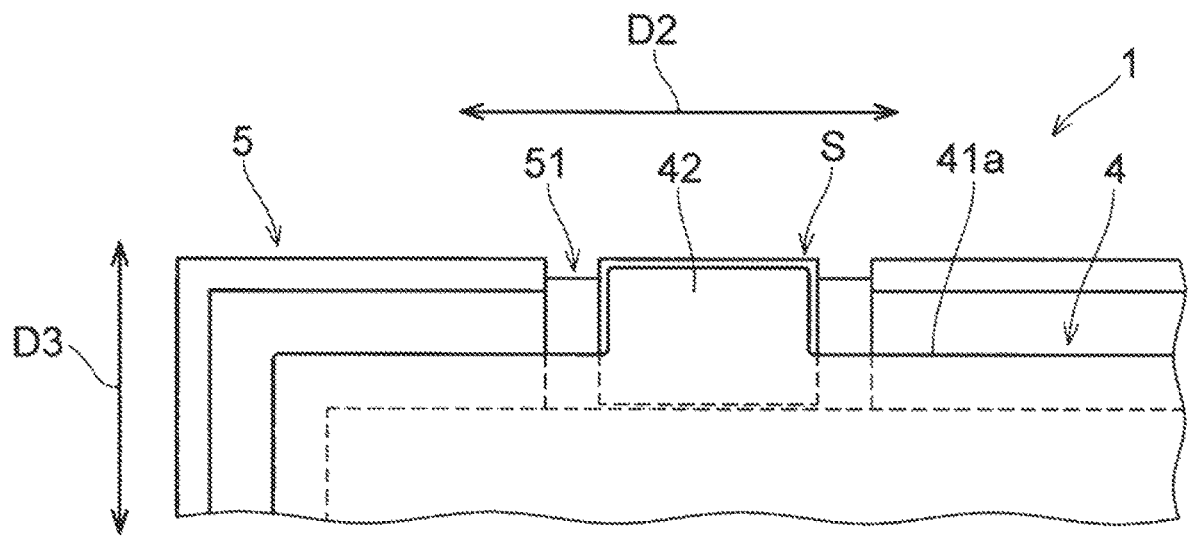
FIG. 6 schematically shows the display apparatus according to one embodiment of the invention, wherein the optical sheet and the slider are at the initial positions thereof.
Figure 7:
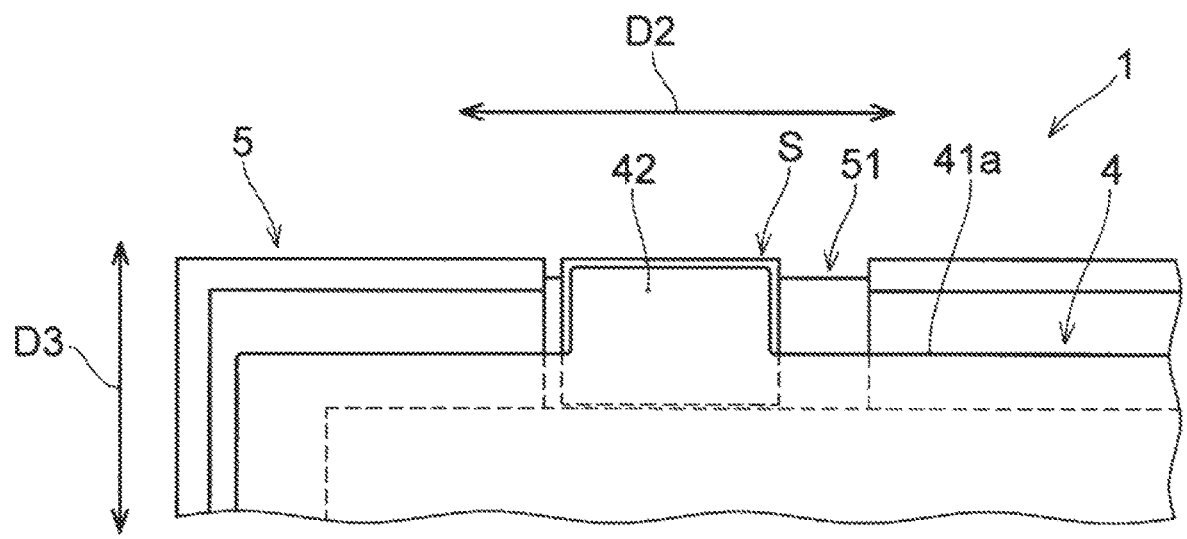
FIG. 7 schematically shows the display apparatus according to one embodiment of the invention, wherein the optical sheet expands to move the slider.

Specifically, when the optical sheet 4 expands due to heat in the horizontal direction D2 from the initial state at which the optical sheet 4 has no expansion or contraction as shown in FIG. 6, the length of the optical sheet 4 in the horizontal direction D2 increases compared to that in the initial state. As the optical sheet 4 is fixed to the slider S by the fixing part 42, as shown in FIG. 7, the slider S moves according to expansion of the optical sheet 4. While only the slider S in the first end region R21 is shown in FIG. 7, the slider S in the second end region R22 also moves in the same manner with expansion of the optical sheet 4, and the slider S in the first end region R21 and the slider S in the second end region R22 move so as to be separate from each other. In this way, when the optical sheet 4 expands, the optical sheet 4 is maintained in a flat state, making it possible to suppress deflecting and wrinkling of the optical sheet 4.

Figure 8:
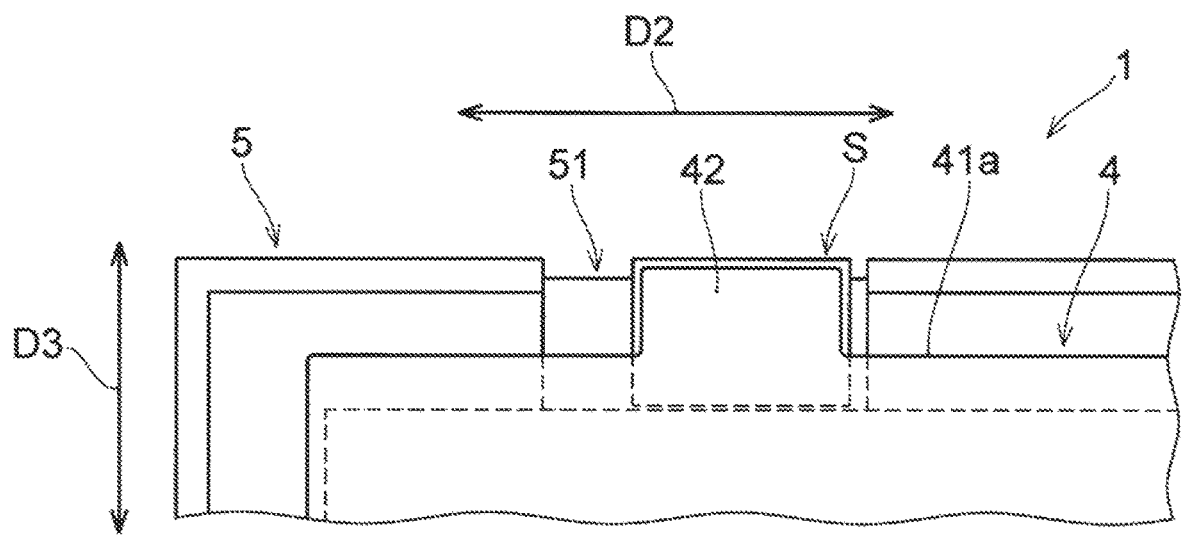
FIG. 8 schematically shows the display apparatus according to one embodiment of the invention, wherein the optical sheet contracts to move the slider.

Moreover, when the optical sheet 4 contracts in the horizontal direction D2 from the initial state shown in FIG. 6 due to a decrease in the external environmental temperature, the length of the optical sheet 4 in the horizontal direction D2 decreases compared to the initial state. As the optical sheet 4 is fixed to the slider S by the fixing part 42, as shown in FIG. 8, the slider B moves according to contraction of the optical sheet 4. While only the slider S in the first end region S21 is shown in FIG. 8, the slider S in the second end region R22 also moves in the same manner with contraction of the optical sheet 4, and the slider S in the first end region R21 and the slider S in the second end region R22 move so as to be closer to each other. In this way, when the optical sheet 4 contracts, the optical sheet 4 is maintained in a flat state, making it possible to suppress deflecting and wrinkling of the optical sheet 4.

Moreover, the fixing part 42 is fixed to the slider S being mounted to the support part 51 of the supporting member 5. Therefore, it is suppressed that the optical sheet 4 moves frontward with respect to the slider S or the supporting member 5. Specifically, it is suppressed that the fixing part 42 of the optical sheet 4 moves in a direction being perpendicular to the fixing surface S12 of the slider S or the front surface of the frame plate F1 of the frame body F. Therefore, it is suppressed that the optical sheet 4 at the one side 41a of the optical sheet 4 flutters with respect to the supporting member 5 (the frame plate F1) due to vibrations occurring during conveyance with the optical sheet 4 being mounted to the supporting member 5. In this way, it is suppressed that the optical sheet 4, or a member adjacent to the optical sheet 4 (for example, the display panel 3, or the other optical sheets in a case that a plurality of optical sheet is provided) is damaged due to collision between the optical sheet 4 and the member adjacent to the optical sheet 4. Moreover, as the fixing part 42 is fixed to the slider S, an operation to temporarily fix the optical sheet 4 using a member for temporary fixing, such as a tape or a clip, to prevent fluttering at the time of conveyance of the optical sheet 4 is not necessary. Consequently, without consuming time and effort to remove the member for temporary fixing from the optical sheet 4 after conveyance, the other members constituting the display apparatus 1 may be assembled as they are, improving the operability.

In the embodiment, as shown in FIG. 4, the fixing part 42 has a projecting part projecting outward (upward) with respect to the one side 41a of the optical sheet 4 (below called a projecting region 42b). In the embodiment, the projecting region 42b is a part of the fixing part 42 being a region fixed to the slider S. The fixing part 42 may be fixed to the slider S only in the projecting region 42b, or the fixing part 42 may be fixed to the slider S only in the part of the projecting region 42b.

In the embodiment, as shown in FIG. 4, the fixing surface S12 of the slider S is fixed to the projection region 42b of the fixing part 42 and to an inner part positioned inner with respect to the one side 41a of the optical sheet 4 (below called an inner region 42c). In other words, the fixing part 42 to be fixed, for example by fusion, to the fixing surface S12 of the slider S extends outward from and inward to the one side 41a of the optical sheet 4. In this case, compared to a case in which the fixing part 42 is not fixed to the slider S in the inner region 42c, a force being applied to the slider S in the horizontal direction D2 when the optical sheet 4 expands and contracts in the horizontal direction D2 is difficult to disperse, making movement of the slider S in the horizontal direction D2 smooth. Therefore, deflecting and wrinkling of the optical sheet 4 at the time of expansion and contraction of the optical sheet 4 can be suppressed further.

While the fixing part 42 has the projecting region 42b in the embodiment, the fixing part 42 may be configured only with the inner region 42c inner with respect to the one side 41 while not providing the projecting region 42b, for example.

The shape of the fixing part 42 is not particularly limited as long as fixing part 42 may be fixed to the slider S. While the fixing part 42 is a rectangle being long in the horizontal direction D2 in the embodiment, fixing part 42 may be of a different shape such as a trapezoid or a semi-circle.

The fixing part 42 is provided in accordance with the position and the number of sliders S. While the fixing part 42 are provided at two locations in the one side 41a in the embodiment. In a case that more than two of sliders S are provided, such as the number of sliders S being four, for example, the same number of the fixing part 42 as that of the slider S may be provided. Moreover, in the embodiment, one fixing part 42 is provided both in the first end region R21 and the second end region R22, respectively, only one fixing part 42 may be provided in only one end region of the two end regions R21, R22.

Second Embodiment

Next, the display apparatus in a second embodiment is described. Those points described in each of the configurations in the first embodiment can also be applied in the same manner to the second embodiment. In the description below, those points described in the first embodiment will be omitted.

Figure 9:
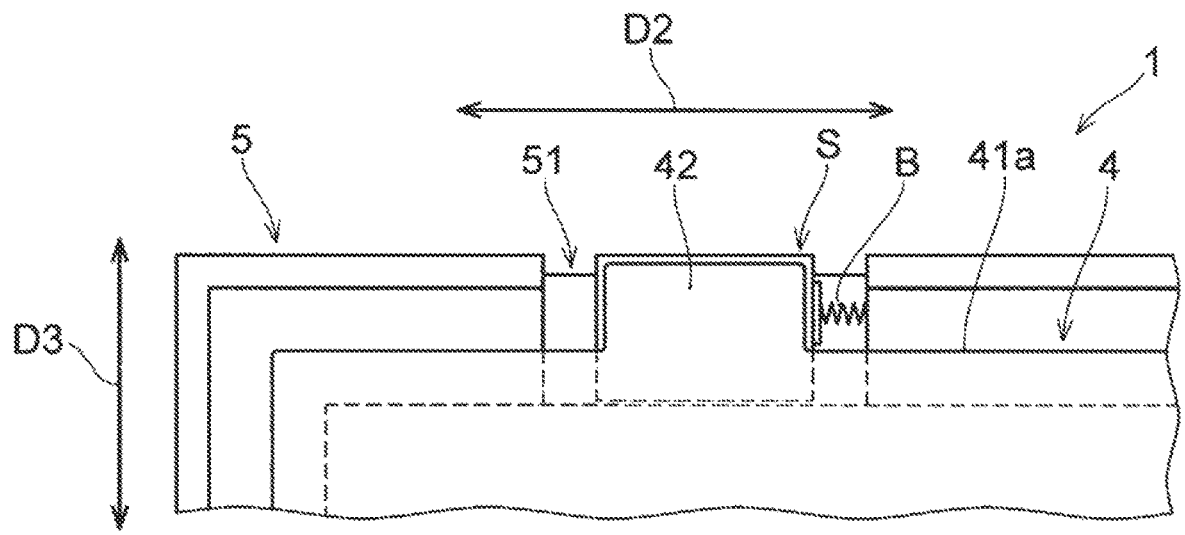
FIG. 9 schematically shows the display apparatus according to a second embodiment of the invention.

As shown in FIG. 9, a display apparatus 1 in the embodiment further comprises a biasing member B to bias a slider S in a direction in which an optical sheet 4 expands along one side 41a of the optical sheet 4. The biasing member B biases the slider S in a direction in which the optical direction 4 expands in a horizontal direction D2 to assist movement of the slider S. Of the expansion and contraction of the optical sheet 4, the force to move the slider S is more difficult to be transmitted in a case in which the optical sheet 4 expands than in a case in which the optical sheet 4 contracts. Therefore, assisting the movement of the slider S by the biasing member B when the optical sheet 4 expands causes the slider S to be surely moved with expansion of the optical sheet 4 at the time of expansion of the optical sheet 4, making it possible to maintain the optical sheet 4 in a flat state. Thus, deflecting and wrinkling of the optical sheet 4 can be suppressed more surely. When the optical sheet 4 contracts, the slider S moves in a direction being opposite to the movement direction of the slider S when the optical sheet 4 expands, against the biasing force of the biasing member B. As the slider S is pulled toward a central region R1 with tension being applied to the optical sheet 4 at the time of contraction of the optical sheet 4, the slider S easily moves, and the slider S moves with contraction of the optical sheet even when the biasing member B is provided.

In the embodiment, a coil spring to bias the slider S is used. However, the type of the biasing member B is not particularly limited as long as the biasing member B can bias the slider S in the direction in which the optical sheet 4 expands. For example, the biasing member B may be an elastic member such as rubber. Moreover, in the embodiment, the biasing member B is provided with respect to the slider S at a position being opposite to the direction in which the optical sheet 4 expands (on the right in FIG. 9). However, the position at which the biasing member B is provided is not particularly limited. For example, the biasing member B may be provided with respect to the slider S in the direction in which the optical sheet 4 expands, or both in the direction in which the optical sheet 4 expands and in a direction being opposite to the direction in which it expands.

Third Embodiment

Next, the display apparatus in a third embodiment is described. Those points described in each of the configurations in the first embodiment and the second embodiment can also be applied in the same manner to the third embodiment. In the description below, those points described in the first embodiment and the second embodiment will be omitted.

Figure 10:
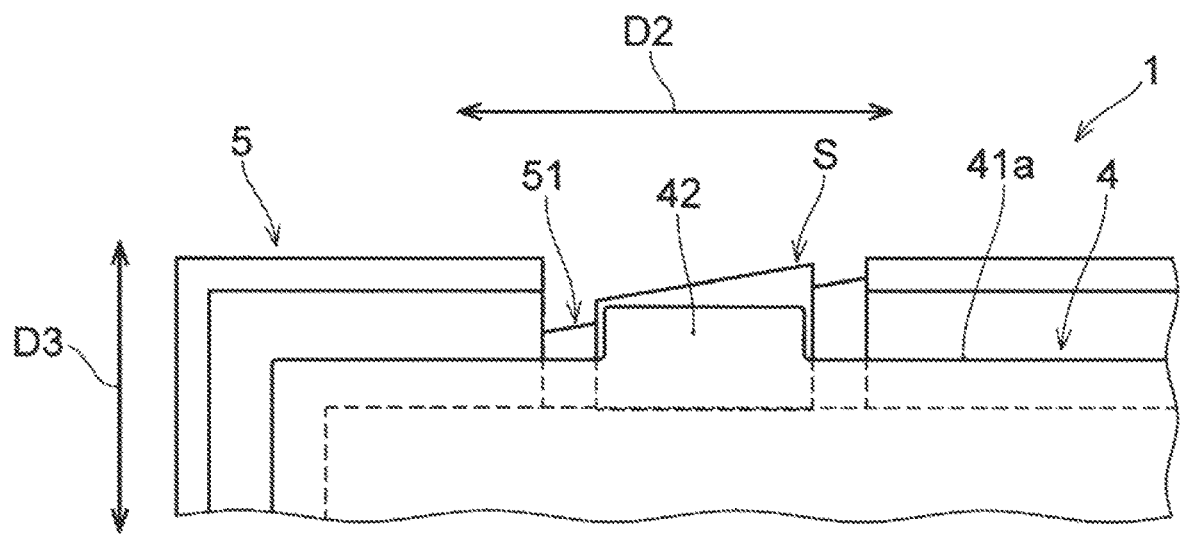
FIG. 10 schematically shows the display apparatus according to a third embodiment of the invention.
Figure 11:
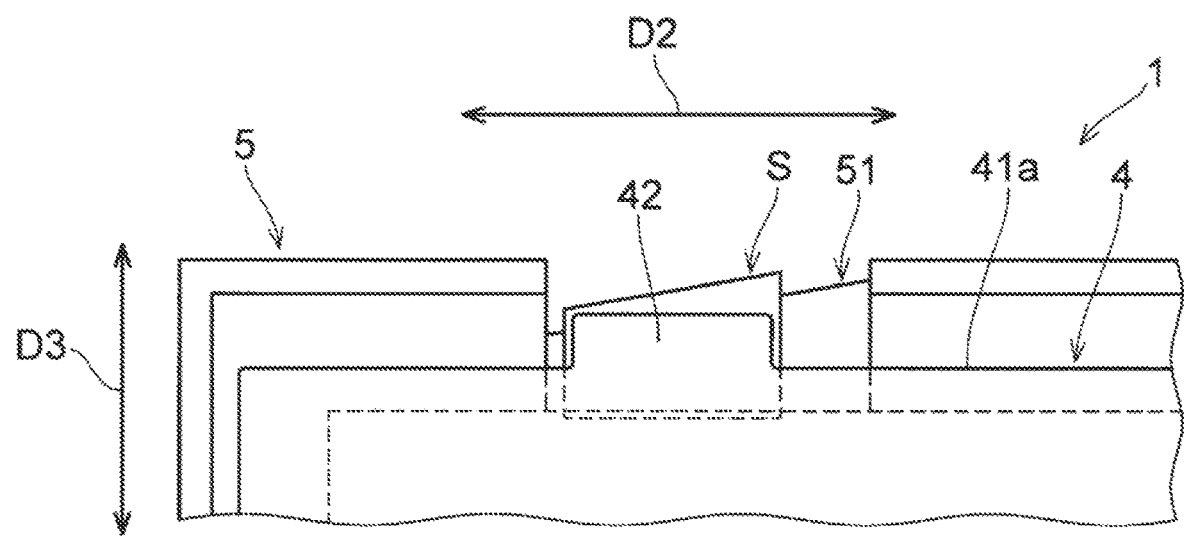
FIG. 11 schematically shows the optical sheet expanding to move the slider from the state shown in FIG. 10.

In a display apparatus 1 in the embodiment, as shown in FIG. 10, a support part 51 is inclined such that a slider S moves in the direction in which an optical sheet 4 expands when the optical sheet 4 expands along one side 41a of the optical sheet 4. While the angle of inclination of the support part 51 is not particularly limited, for example, the angle of inclination may be set between 15 and 40 degrees, preferably, between 20 and 30 degrees with respect to the horizontal surface. The above-mentioned inclination of the support part 51 causes the slider S to easily move in a direction in which the optical sheet 4 expands in a horizontal direction D2, assisting the movement of the slider S. Specifically, in a case that the display apparatus 1 is vertically placed, the support part 51 is inclined such that the height thereof decreases from the center of the optical sheet 4 toward the end of the optical sheet 4. In this way, gravity applied to the slider S and the optical sheet 4 being fixed to the slider S causes the slider S to easily move in the direction in which the optical sheet 4 expands.

Moreover, the slider S may have a rolling element such as a wheel, a roller, or a ball on the opposing surface opposing the support part 51. In a case that the slider S has the rolling element, the slider S moves smoothly with respect to the support part 51. The rolling element may be provided to the support part 51, or may be provided to both the slider S and the support part 51.

As explained with respect to the second embodiment, of the expansion and contraction of the optical sheet 4, the force to move the slider S is more difficult to be transmitted in a case in which the optical sheet 4 expands than in a case in which the optical sheet 4 contracts. Therefore, the movement of the slider S being assisted by the inclination of the support part 51 when the optical sheet 4 expands causes the slider S to be surely moved with expansion of the optical sheet 4 at the time of expansion of the optical sheet 4, making it possible to maintain the optical sheet 4 in a flat state. Thus, deflecting and wrinkling of the optical sheet 4 can be suppressed more surely. When the optical sheet 4 contracts, the slider S moves in a direction being opposite to the movement direction of the slider S when the optical sheet 4 expands along the inclination of the support part 51, against gravity. As the slider S is pulled toward a central region R1 with tension being applied to the optical sheet 4 at the time of contraction of the optical sheet 4, the slider S easily moves, and it moves with contraction of the optical sheet 4.

Fourth Embodiment

Next, the display apparatus in a fourth embodiment is described. Those points described in each of the configurations in the first to third embodiments can also be applied in the same manner to the fourth embodiment. In the description below, those points described in the first to third embodiments will be omitted.

Figure 12:
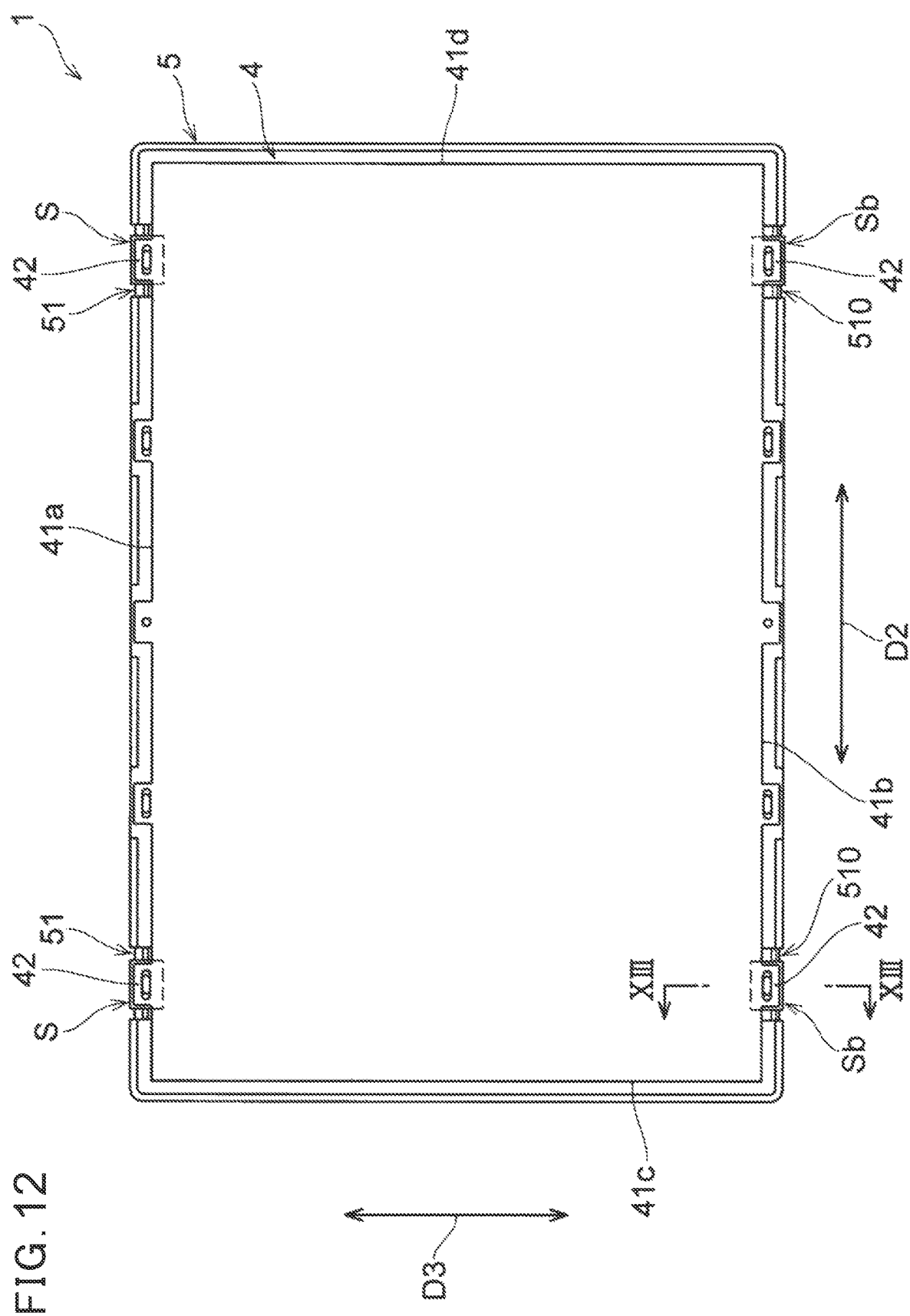
FIG. 12 schematically shows the display apparatus according to a fourth embodiment of the invention.

As shown in FIG. 12, in a display apparatus 1 in the embodiment, a support part 51 is provided along two opposing sides 41a, 41b of four sides 41a, 41b, 41c, 41d of an optical sheet 4, and sliders S, Sb are slidably mounted to the support parts 51, 510 being provided along the two sides 41a, 41b. In this case, the optical sheet 4 is fixed to the sliders S, Sb by a fixing part 42 at the two opposing sides 41a, 41b. Consequently, it is suppressed that at the two opposing sides 41a, 41b of the optical sheet 4, the fixing part 42 of the optical sheet 4 moves in a direction being perpendicular to a fixing surface S12 of the sliders S, Sb or the front surface of a frame plate F1 of a frame body F. Therefore, it is suppressed that the optical sheet 4 at two opposing sides 41a, 41b flutters with respect to a supporting member 5 due to vibrations occurring during conveyance with the optical sheet 4 being mounted to the supporting member 5. When fluttering of the optical sheet 4 at the two opposing sides 41a, 41b is suppressed, fluttering of the overall optical sheet 4 such as fluttering at the other two sides 41c, 41d is suppressed. In this way, it is suppressed that the optical sheet 4, or a member adjacent to the optical sheet 4 (for example, the display panel 3, or the other optical sheets in a case that a plurality of optical sheets is provided) is damaged due to collision between the optical sheet 4 and the member adjacent to the optical sheet 4. Moreover, as the fixing part 42 is fixed to the sliders S, Sb at the two opposing sides 41a, 41b of the optical sheet 4, an operation to temporarily fix the optical sheet 4 using a member for temporary fixing, such as a tape or a clip, to prevent fluttering at the time of conveyance of the optical sheet 4 is not necessary. Consequently, without consuming time and effort to remove the member for temporary fixing from the optical sheet 4 after conveyance, the other members constituting the display apparatus 1 may be assembled as they are, improving the operability.

In the embodiment, the slider (a first slider) S is configured to slide in a horizontal direction D2 with respect to the support part 51 being provided at the upper end part of the display apparatus 1. The slider (a second slider) Sb is configured such that the slider Sb can slide, not only in the horizontal direction D2, but also in a vertical direction D3 with respect to the support part 510 being provided at the lower end of the display apparatus 1. In this way, expansion and contraction in the vertical direction D3 of the optical sheet 4 are absorbed by the slider Sb moving in the vertical direction D3 with respect to the support part 510 being provided at the lower end of the display apparatus 1, making it possible to maintain the optical sheet 4 in a flat state.

Figure 13:
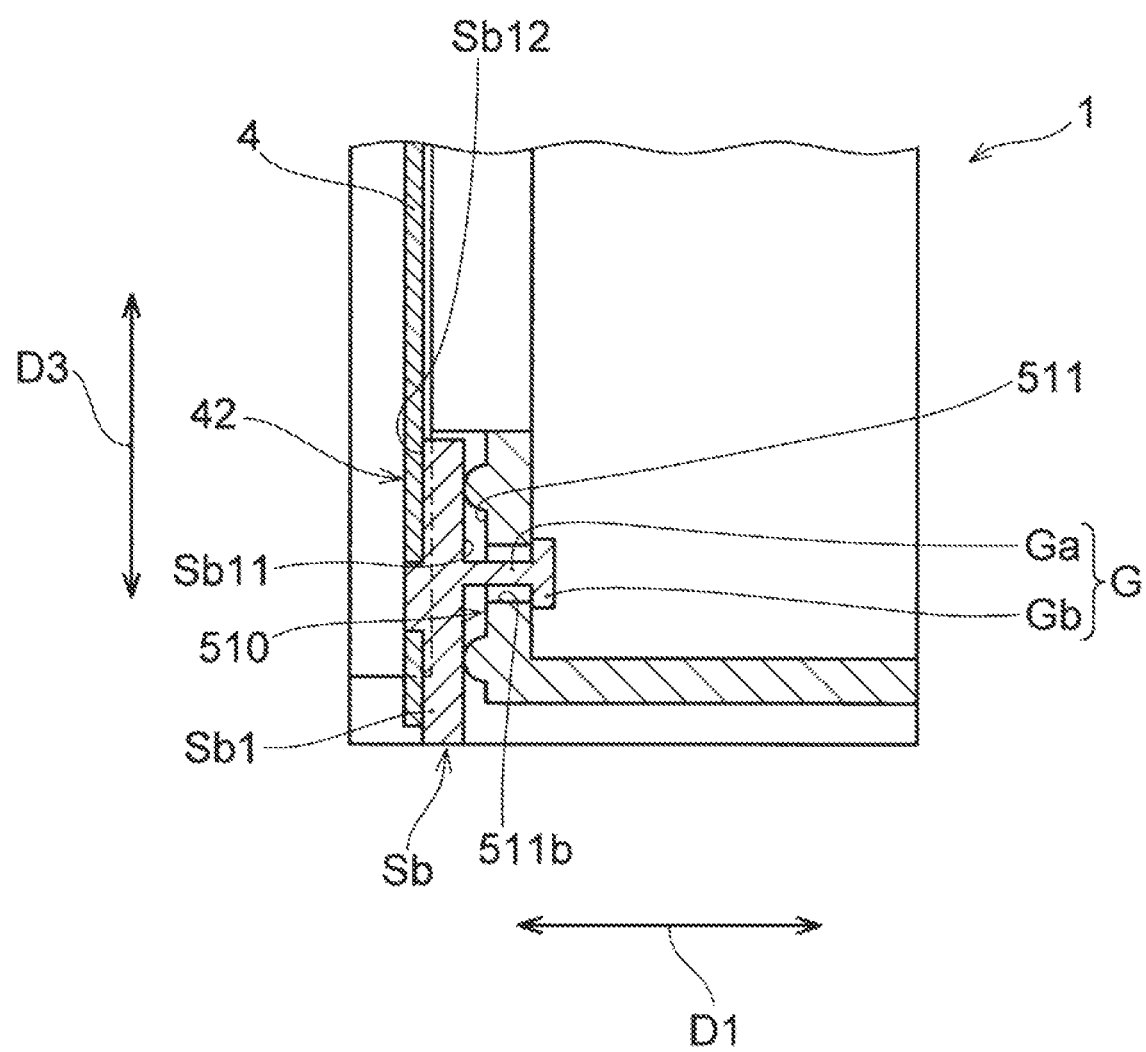
FIG. 13 shows a cross-sectional view along a line XIII-XIII in FIG. 12.

The slider S may be configured in the same manner as the sliders described in the first to third embodiments. The structure of the slider Sb is not particularly limited, as long as the slider Sb is configured such that, in accordance with expansion and contraction in the vertical direction D3 of the optical sheet 4, slider Sb can move in the vertical direction D3 with respect to the support part 510 and slide in the horizontal direction D2 with respect to the support part 510. In the embodiment, as shown in FIG. 13, the slider Sb has a sliding surface Sb11 opposing the supporting surface 511 of the support part 510, and the sliding surface Sb11 slides with respect to the supporting surface 511. Specifically, the slider Sb has a plate-like part Sb1 being arranged substantially parallel to the supporting surface 511. A surface, which faces the supporting surface 511, of the plate-like part Sb1 is the sliding surface Sb11. A surface, which is opposite to the sliding surface Sb11, of the plate-like part Sb1 is a fixing surface Sb12 onto which the fixing part of the optical sheet 4 is fixed. The plate-like part Sb1 has a guiding protrusion G projecting from the sliding surface Sb11 toward the supporting surface 511 of the support part 510. The guiding protrusion G has an inserting part Ga to be inserted into the supporting surface 511 and an engaging part Gb to engage with a surface being opposite to the supporting surface 511.

Figure 14:
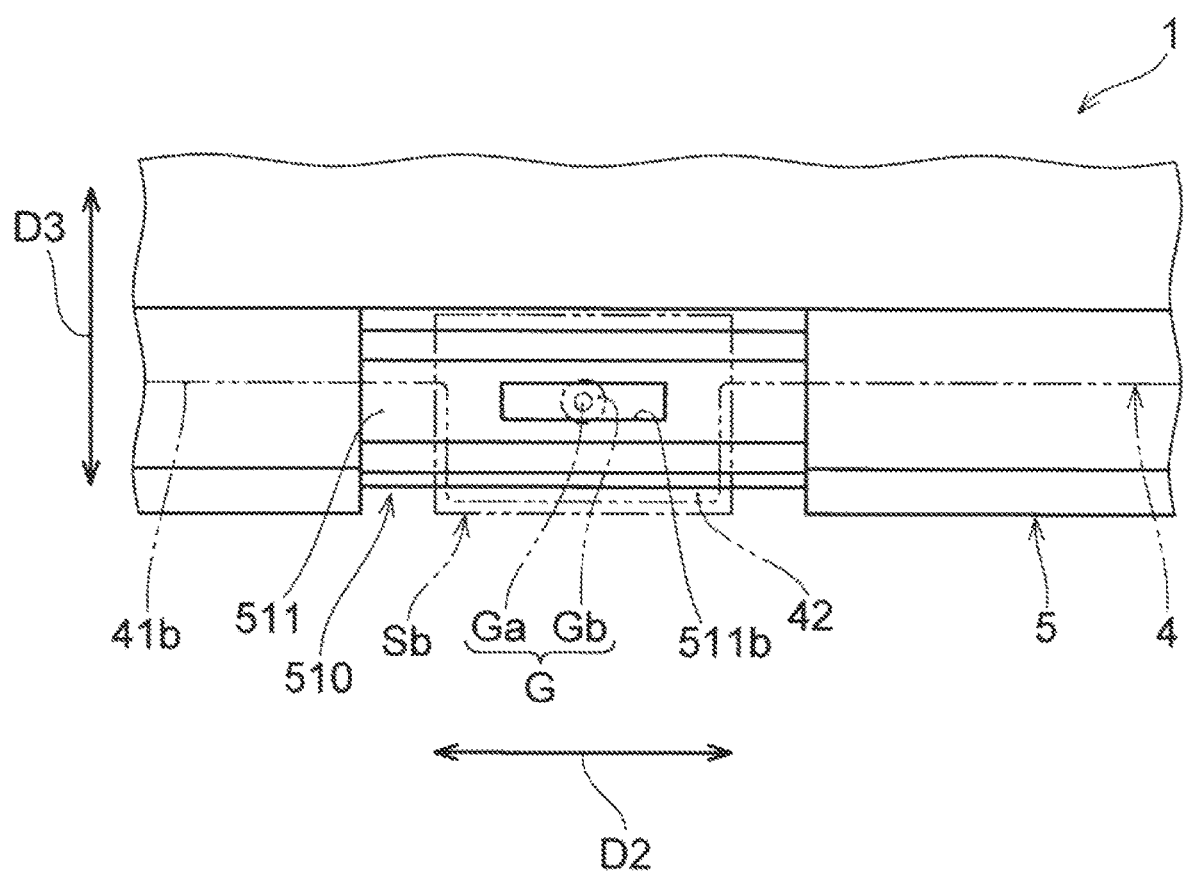
FIG. 14 schematically shows a support part being provided at the lower end of the display apparatus according to the fourth embodiment of the invention.

As shown in FIGS. 13 and 14, the support part 510 has, at the supporting surface 511, a guiding part 511b into which the guiding protrusion G can be inserted. In the embodiment, the guiding part 511b is a rectangular through hole being long in the horizontal direction D2, into which through hole the guiding protrusion G can be inserted. The shape and structure of the guiding part 511b are not particularly limited. For example, the guiding part 511b may be a non-penetrating groove. A predetermined clearance is formed in the horizontal direction D2 between the opening edge of the guiding part 511b and the guiding protrusion G (the inserting part Ga) such that the guiding protrusion G can move with respect to the guiding part 511b in the horizontal direction D2 when the optical sheet 4 expands and contracts in the horizontal direction D2. Moreover, a predetermined clearance is formed in the vertical direction D3 between the opening edge of the guiding part 511b and the guiding protrusion G (the inserting part Ga) such that the guiding protrusion G can move with respect to the guiding part 511b in the vertical direction D3 when the optical sheet 4 expands and contacts in the vertical direction D3. In this way, the guiding protrusion G can move in the horizontal direction D2 and the vertical direction D3 with respect to the guiding part 511b in accordance with expansion and contraction in the horizontal direction D2 and the vertical direction D3 of the optical sheet 4. Therefore, the display apparatus 1 in the embodiment suppresses fluttering during conveyance at the two opposing sides 41a, 41b of the optical sheet 4 and can deal with expansion and contraction, not only in the horizontal direction D2, but also in the vertical direction D3 of the optical sheet 4 with the optical sheet 4 being suspended.

Fluttering at the lower end of the optical sheet 4 can be suppressed only by the weight of the slider Sb. In the embodiment, in order to surely suppress fluttering of the optical sheet, the guiding protrusion G has the engaging part Gb to engage with a surface being opposite to the supporting surface 511. In this case, even when a large vibration is applied during conveyance, the engaging part Gb engages with a surface being opposite to the supporting surface 511 to further suppress fluttering at the lower end of the optical sheet 4. In the embodiment, the guiding protrusion G has an inserting part Ga being circular-cylinder shaped and an engaging part Gb having a width being greater than that of the guiding part 511b in the vertical direction D3. The engaging part Gb is configured to engage with a surface being opposite to the supporting surface 511. However, the shape and structure of the guiding protrusion G is not particularly limited. For example, like the engaging part Ea (see FIG. 5) of the slider S, the guiding protrusion may be configured as a plate-like inserting part extending substantially perpendicularly from the plate-like part Sb1 and an L-shaped guiding protrusion having an engaging part extending perpendicularly from the tip of the plate-like inserting part.

CONCLUSION (1) A display apparatus according to one embodiment of the invention comprising: a display panel; an optical sheet having rectangular shape; and a supporting member having a slider supporting at least one side of the optical sheet, wherein the supporting member has a support part to which the slider is slidably mounted, the optical sheet has a fixing part to be fixed to the slider, the fixing part being provided along an end region positioned from a central region of the at least one side of the optical sheet toward an end of the at least one side of the optical sheet, and the slider slides with respect to the support part in accordance with expansion and contraction of the optical sheet in a direction along the at least one side of the optical sheet.

The configuration according to (1) makes it possible to suppress an occurrence of a display failure caused by expansion and contraction of an optical sheet due to heat and to suppress damage of the optical sheet and/or another member being adjacent to the optical sheet.

(2) The display apparatus according to (1), wherein the support part has a supporting surface extending so as to oppose a rear surface of the optical sheet and the slider has a sliding surface opposing the supporting surface.

According to the configuration in (2), the supporting surface and the sliding surface extend substantially parallel to the rear surface of the optical sheet, causing the direction in which the optical sheet expands and contracts and the direction in which the slider slides to be parallel to each other, stabilizing sliding of the slider.

(3) The display apparatus according to (2), wherein the sliding surface and/or the supporting surface has a protrusion projecting from a part of the sliding surface and/or the supporting surface.

The configuration according to (3) can decrease the contact area of the slider with respect to the support part, making it possible to decrease the resistance at the time of sliding of the slider.

(4) The display apparatus according to (2) or (3), wherein the slider has a first plate-like part having the sliding surface, and the first plate-like part has a fixing surface onto which the fixing part of the optical sheet is fixed, the fixing surface being opposite to the sliding surface.

In the configuration according to (4), the front surface of the first plate-like part of the slider being a fixing surface onto which the fixing part is fixed and the rear surface being the sliding surface opposing the supporting surface 1 of the support part causes sliding of the slider in the horizontal direction in accordance with expansion and contraction of the optical sheet to be smooth.

(5) The display apparatus according to (4), wherein the fixing part of the optical sheet has a projecting part projecting outward with respect to the at least one side of the optical sheet, and the fixing surface of the slider is fixed to the projecting part of the fixing part and to an inner part positioned inner with respect to the at least one side of the optical sheet to be fixed to the fixing part.

According to the configuration in (5), compared to a case in which the fixing part is not fixed to the fixing surface of the slider in an inner part positioned inner with respect to the one side of the optical sheet, a force being applied to the slider in the horizontal direction when the optical sheet expands and contracts in the horizontal direction is difficult to disperse, making movement of the slider in the horizontal direction smooth. Therefore, deflecting and wrinkling of the optical sheet at the time of expansion and contraction of the optical sheet can be suppressed further.

(6) The display apparatus according to (4) or (5), wherein the fixing part of the optical sheet has a through hole penetrating in a thickness direction of the optical sheet; and the fixing surface has a positioning protrusion to engage with the through hole of the optical sheet.

According to the configuration in (6), the positioning protrusion of the slider engaging with the through hole of the optical sheet causes the optical sheet to be positioned at a predetermined position when fixing the fixing part of the optical sheet onto the fixing surface of the slider. Therefore, fixing of the optical sheet to the slider can be easily performed.

(7) The display apparatus according to any one of (1) to (6), wherein the slider and/or the supporting member has an engaging part to engage the slider with the supporting member to suppress the slider falling off the supporting member.

In the configuration according to (7), the engaging part can engage the slider with the support part to suppress the slider falling off the supporting member.

(8) The display apparatus according to (7), wherein the support part has a second supporting surface extending perpendicularly to the supporting surface and extending along the direction along the at least one side of the optical sheet, the slider has a first plate-like part having the sliding surface and a second plate-like part opposing the second supporting surface; and the engaging part is provided at the second supporting surface and/or the second plate-like part.

In the configuration according to (8), the engaging part engaging with the supporting member on the second supporting surface being perpendicular to the sliding surface causes sliding of the slider to be smooth.

(9) The display apparatus according to (1) to (8), the display apparatus further comprising a biasing member to bias the slider in a direction in which the optical sheet expands along the at least one side of the optical sheet.

In the configuration according to (9), the movement of the slider being assisted by the biasing member when the optical sheet expands causes the slider to be surely moved with expansion of the optical sheet at the time of expansion of the optical sheet, making it possible to maintain the optical sheet in a flat state. Thus, deflecting and wrinkling of the optical sheet can be suppressed more surely.

(10) The display apparatus according to (1) to (9), wherein the support part is inclined such that the slider moves in a direction in which the optical sheet expands when the optical sheet expands along the at least one side of the optical sheet.

According to the configuration in (10), the inclination of the support part causes the slider to easily move in a direction in which the optical sheet expands in the horizontal direction, assisting the movement of the slider.

(11) The display apparatus according to (1) to (10), wherein the support part is positioned at an upper end part of the display apparatus with the display apparatus being installed vertically; and the optical sheet is suspended from the support part via the slider.

In the configuration according to (11), the optical sheet can be suspended to be supported with the display apparatus being set vertically.

(12) The display apparatus according to (1) to (11), wherein the support part is provided along two opposing sides of four sides of the optical sheet; and the slider is slidably mounted to the support part being provided along the two opposing sides.

In the configuration according to (12), it is suppressed that the optical sheet at the two opposing sides flutters with respect to the supporting member due to vibrations occurring during conveyance with the optical sheet being mounted to the supporting member.

DESCRIPTION OF REFERENCE NUMERALS

1 DISPLAY APPARATUS
3 DISPLAY PANEL
4 OPTICAL SHEET
4b REAR SURFACE OF OPTICAL SHEET
41a, 41b, 41c, 41d SIDE OF OPTICAL SHEET
411 FIRST END
412 SECOND END
42 FIXING PART
42a THROUGH HOLE
42b PROJECTING REGION
42c INNER REGION
5 SUPPORTING MEMBER
51, 510 SUPPORT PART
511 SUPPORTING SURFACE
511a PROTRUSION
B BIASING MEMBER
Ea ENGAGING PART
R1 CENTRAL REGION
R21 FIRST END REGION
R22 SECOND END REGION
S, Sb SLIDER
S1 FIRST PLATE-LIKE PART
S11, Sb11 SLIDING SURFACE
S12, Sb12 FIXING SURFACE
S13 POSITIONING PROTRUSION
S2 SECOND PLATE-LIKE PART

The invention claimed is:

1. A display apparatus comprising:
a display panel;
an optical sheet having rectangular shape; and
a supporting member having a slider supporting at least one side of the optical sheet, wherein
the supporting member has a support part to which the slider is slidably mounted,
the optical sheet has a fixing part to be fixed to the slider, the fixing part being provided along an end region positioned from a central region of the at least one side of the optical sheet toward an end of the at least one side of the optical sheet, and
the slider slides with respect to the support part in accordance with expansion and contraction of the optical sheet in a direction along the at least one side of the optical sheet.

2. The display apparatus according to claim 1, wherein the support part has a supporting surface extending so as to oppose a rear surface of the optical sheet and the slider has a sliding surface opposing the supporting surface.

3. The display apparatus according to claim 2, wherein the sliding surface and/or the supporting surface has a protrusion projecting from a part of the sliding surface and/or the supporting surface.

4. The display apparatus according to claim 2, wherein the slider has a first plate-like part having the sliding surface, and the first plate-like part has a fixing surface onto which the fixing part of the optical sheet is fixed, the fixing surface being opposite to the sliding surface.

5. The display apparatus according to claim 4, wherein the fixing part of the optical sheet has a projecting part projecting outward with respect to the at least one side of the optical sheet, and the fixing surface of the slider is fixed to the projecting part of the fixing part and to an inner part positioned inner with respect to the at least one side of the optical sheet to be fixed to the fixing part.

6. The display apparatus according to claim 4, wherein
the fixing part of the optical sheet has a through hole penetrating in a thickness direction of the optical sheet; and
the fixing surface has a positioning protrusion to engage with the through hole of the optical sheet.

7. The display apparatus according to claim 1, wherein the slider and/or the supporting member has an engaging part to engage the slider with the supporting member to suppress the slider falling off the supporting member.

8. The display apparatus according to claim 7, wherein
the support part has a second supporting surface extending perpendicularly to the supporting surface and extending along the direction along the at least one side of the optical sheet,
the slider has a first plate-like part having the sliding surface and a second plate-like part opposing the second supporting surface; and
the engaging part is provided at the second supporting surface and/or the second plate-like part.

9. The display apparatus according to claim 1, the display apparatus further comprising a biasing member to bias the slider in a direction in which the optical sheet expands along the at least one side of the optical sheet.

10. The display apparatus according to claim 1, wherein the support part is inclined such that the slider moves in a direction in which the optical sheet expands when the optical sheet expands along the at least one side of the optical sheet.

11. The display apparatus according to claim 1, wherein
the support part is positioned at an upper end part of the display apparatus with the display apparatus being installed vertically; and
the optical sheet is suspended from the support part via the slider.

12. The display apparatus according to claim 1, wherein
the support part is provided along two opposing sides of four sides of the optical sheet; and
the slider is slidably mounted to the support part being provided along the two opposing sides.

* * * * *